US011526362B2

(12) United States Patent
Christiansen et al.

(10) Patent No.: US 11,526,362 B2
(45) Date of Patent: Dec. 13, 2022

(54) AUTOMATIC HYDRATION OF FEATURE FILE BATCHES

(71) Applicant: MICROSOFT TECHNOLOGY LICENSING, LLC, Redmond, WA (US)

(72) Inventors: Neal Robert Christiansen, Bellevue, WA (US); Yanran Hao, Redmond, WA (US); Mingbiao Fei, Sammamish, WA (US); Vinod Reddy Chavva, Kirkland, WA (US); Aniket Krishnat Naravanekar, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 586 days.

(21) Appl. No.: 16/428,861

(22) Filed: May 31, 2019

(65) Prior Publication Data
US 2020/0379777 A1    Dec. 3, 2020

(51) Int. Cl.
*G06F 16/907*    (2019.01)
*G06F 9/4401*    (2018.01)

(52) U.S. Cl.
CPC .......... *G06F 9/4406* (2013.01); *G06F 9/4411* (2013.01); *G06F 16/907* (2019.01)

(58) Field of Classification Search
CPC .................................................. G06F 16/907
See application file for complete search history.

(56) References Cited

U.S. PATENT DOCUMENTS

| 2009/0241131 A1* | 9/2009 | Needamangala ......... G06F 9/54 |
| | | 719/327 |
| 2013/0055237 A1 | 2/2013 | Fei et al. |
| 2013/0311986 A1 | 11/2013 | Arrouye et al. |
| 2014/0121008 A1* | 5/2014 | Canessa ................. A63F 13/69 |
| | | 463/29 |

(Continued)

OTHER PUBLICATIONS

"International Search Report and Written Opinion Issued in PCT Application No. PCT/US2020/031257", dated Aug. 17, 2020, 12 Pages.

*Primary Examiner* — Jae U Jeon
(74) *Attorney, Agent, or Firm* — Jacob P. Rohwer; Newport IP, LLC

(57) ABSTRACT

A computing device saves storage space by foregoing writing the payloads for batches of feature files to local storage and then automatically downloading payloads for individual batches of feature files as associated features are called upon. In various embodiments, an operating system (OS) that includes both frequently used and infrequently used features is executing on the computing device. Batches of feature files for the frequently used features of the OS may be hydrated on the computing device whereas batches of feature files for the infrequently used features of the OS may be left dehydrated on the computing device. When an infrequently used feature is requested, the computing device automatically downloads a corresponding batch of feature files. Then, the computing device may fulfill the request by implementing the infrequently used feature. Thus, predetermined batches of feature files remain immediately accessible at the computing device without consuming storage space unless called upon.

18 Claims, 7 Drawing Sheets

(56) References Cited

U.S. PATENT DOCUMENTS

| | | | |
|---|---|---|---|
| 2015/0169602 A1* | 6/2015 | Shankar | G06F 16/907 |
| | | | 707/825 |
| 2016/0026805 A1* | 1/2016 | Kurian | G06F 21/602 |
| | | | 713/165 |
| 2018/0046635 A1 | 2/2018 | Nichols | |
| 2018/0129515 A1* | 5/2018 | Kumar | G06F 8/65 |
| 2018/0197171 A1* | 7/2018 | Steinman | G06Q 20/227 |

\* cited by examiner

AUTOMATIC HYDRATION OF FEATURE FILE BATCHES

BACKGROUND

Computing devices are often configured with software components that provision access to vast numbers of features that far exceed those that are routinely used. Provisioning access to even seldom used features is beneficial in terms of maximizing the versatility of computing devices. For example, a typical operating system (OS) may include hundreds or even thousands of features that may be rarely or even never used by any given user. Fully installing the OS onto a computing device may provide maximum versatility since it is impractical to know beforehand which features will be used—let alone when. Unfortunately, locally storing all of the feature files that are needed to implement both routinely and seldom used features consumes a substantial amount of drive space. This is particularly troublesome in computing devices having low storage capacity.

Some techniques reduce an overall software footprint on a computing device by removing seldom used feature files. Such techniques enable users to manually select feature files for removal to free up storage space. However, even for sophisticated users these techniques are cumbersome and error prone because many OS features and applications have been incrementally developed over time and include dependencies on a wide array of feature files. For this reason, a user might not fully understand which feature files are needed to run certain applications and may flag for removal feature files that are needed to implement a desired functionality—inadvertently rendering the desired functionality inoperable. Thus, while it is desirable to prevent seldom used feature files from consuming storage space, conventional devices cannot achieve this while also providing accessibility to these feature files if called upon.

It is with respect to these and other considerations that the disclosure made herein is presented.

SUMMARY

Technologies described herein enable a computing device to save storage space by foregoing writing the payloads for predetermined batches of feature files to local storage and then automatically downloading payloads for individual batches of feature files as associated features are called upon. Exemplary embodiments include a computing device that is initially configured with some batches of feature files in a hydrated state and other batches of feature files in a dehydrated state. For illustrative purposes, suppose that an operating system (OS) is executing on the computing device and that the OS includes many features—some of which are frequently used and some of which are seldom used. Batches of feature files that are associated with the frequently used features of the OS may be hydrated on the computing device. In contrast, other batches of feature files that are associated with the seldom used features of the OS may be left dehydrated on the computing device. In the event that a seldom used feature is called upon via a request, the computing device may automatically download and locally store a particular batch of feature files that is associated with this seldom used feature. Then, once the particular batch of feature files is written to the local storage, the computing device may fulfill the request by implementing the seldom used feature. In this way, predetermined batches of feature files remain immediately accessible at the computing device without consuming storage space on the computing device unless called upon.

As a specific but non-limiting example, the computing device may be executing an OS that includes a legacy application (e.g., Microsoft Internet Explorer) that has been superseded on the OS by a new default application (e.g., Microsoft Edge). An original equipment manufacturer (OEM) of the computing device may determine that while foregoing locally storage of the payloads for the legacy application unless needed is desirable from a resource usage standpoint, continued availability of the legacy application is desirable from a versatility standpoint (e.g., some users may prefer the legacy application to the new default application). Based on these competing considerations, the OEM may initially configure the computing device with a predetermined batch of feature files that enable implementation of the legacy application in a dehydrated state. This may include writing an individual placeholder file to the computing device in lieu of each actual feature file of this predetermined batch. For example, suppose that the predetermined batch of feature files includes three individual feature files that are each specifically associated with the legacy application (e.g., ie.dll, ie.exe, and ie.xxx). In this example, the computing device may be initially configured with three placeholder files and each individual placeholder file may include metadata that indicates an address from which a payload for a corresponding feature file can be downloaded.

Due to the existence of the placeholder files, the legacy application may appear to be locally available from the perspective of a user of the computing device and even other applications running on the computing device. For example, an icon for the legacy application may appear within an application menu of the OS. However, when a request is generated by the user (or another application) for the legacy application, the computing device may quickly determine that it is currently in the dehydrated state. Then, based on this determination, the computing device may respond by performing an intermediary step (i.e., a step in between receiving the request and servicing the request) to fully download and hydrate the predetermined batch of feature files. After completing this intermediary step, the computing device may then fulfill the request as if the predetermined batch of feature files was hydrated when the request was initially received. In this way, certain OS features can be dehydrated to reduce the OS footprint without affecting the way in which users and applications interact with the OS.

In an exemplary embodiment, a computing device has a storage medium that includes some batches of feature files stored in a hydrated state and other batches of feature files stored in a dehydrated state. As used herein, the term "hydrated state" when used to describe a state of an individual feature file and/or a batch of feature files refers to a state in which a payload of the individual feature file and/or batch of feature files is stored locally on the storage medium of the computing device. For example, if a specific batch of feature files for a specific feature is stored in a hydrated state on the computing device, then all of the binaries that are unique to this specific feature and any other portion of the specific feature's payload (e.g., permissions, registry settings, etc.) are actually written to and take up space (e.g., bytes) on the storage medium. In contrast, the term "dehydrated state" when used to describe a state of an individual feature file and/or a batch of feature files refers to a state in which a payload of the individual feature file and/or batch of feature files is not stored locally on the storage medium of the computing device. For example, if a specific batch of feature files for a specific feature is stored in a dehydrated state on the computing device, then binaries that are unique to this specific feature and/or other portions of the specific feature's payload are not written to and do not take up space on the storage medium.

It will be appreciated that the major benefit of storing individual feature files or batches thereof in a dehydrated state is to conserve disk space. Take for example, the Windows Mixed Reality Feature (e.g., CAB file name: Microsoft-Windows-Holographic-Desktop-FOD-Package~31bf3856ad364e35~amd64~~.cab) that has a payload size of 1.93 Gigabytes. Storing this specific feature in a dehydrated state as described herein would effectively reduce the storage footprint of an OS by 1.93 GB—minus the size of any metadata and/or placeholder files that are stored in lieu of the payload. It will further be appreciated that if the feature file(s) that enable the computing device to implement a particular feature are dehydrated, then these feature file(s) will need to be hydrated by downloading these feature file(s) and/or the payload thereof from a valid installation source.

With regard to automatically hydrating individual batches of feature files onto the local drive as needed, the computing device may receive a request for access to a feature file that is currently dehydrated—but that when hydrated is usable for implementing aspects of a desired feature. Stated alternatively, the payload portion of the feature file that is actually usable for implementing the desired feature is not currently stored on the local storage medium of the computing device. The feature file for which access is requested (also referred to herein as the "requested feature file") may be included within a batch of feature files that includes one or more other feature files. As a specific example, the requested feature file may be a feature file named "feature_name.exe" file that is batched together with another feature file named "feature_name.dll."

Upon receiving the request, the computing device may retrieve at least some metadata that is written to the storage medium in association with the requested feature file. For example, in some embodiments, placeholder files may be written to the storage medium in place of the actual feature files associated with dehydrated features. The placeholder files may comprise metadata that indicates an address from which the feature files may be downloaded. In some embodiments, the placeholder files also indicate a feature provider of the feature files. Stated plainly, the individual placeholder files may point to the actual feature files for which they are serving as placeholders.

The computing device may then use the metadata to generate a download request that is associated with the requested feature file. In some embodiments, the computing device may provide the metadata to a synchronization engine to identify the requested feature file and to indicate the appropriate feature provider from which the requested feature file can be obtained. Based on the metadata, the synchronization engine may then generate and send the download request to the appropriate feature provider. In some implementations, the download request includes an identification of the requested feature file for which access has been requested but does not explicitly indicate the other feature files from the batch. That is, the download request may be limited to the requested feature file(s). Continuing with the specific example from above, upon receiving the request for access to the "feature_name.exe" file, the synchronization engine may generate a download request for this specifically requested feature file only and then transmit the download request to the appropriate feature provider.

On the server side of this implementation, upon receiving the download request, the feature provider may identify an entire predefined batch of feature files to which the requested feature file belongs. Then, rather than returning merely the requested feature file, the feature provider may return a download package that includes the entire predefined batch of feature files. For example, if the download request identifies the "feature_name.exe" file, then the feature provider may retrieve not only the "feature_name.exe" file but also the "feature_name.dll" file and/or any of the parts of the payload for the feature that is currently dehydrated on the computing device. Upon identifying the entire predefined batch of feature files, the feature provider may respond to the download request by providing the computing device with a download package that includes all feature files from the entire predefined batch of feature files.

Back at the client side of this implementation, the computing device receives the download package that includes all of the feature files from the entire predefined batch of feature files. Then, the computing device reads the download package to write each of the included feature files onto the storage medium (e.g., a hard disk, a solid-state hard drive, or any other suitable volatile or non-volatile storage medium) in order to convert these feature files from the dehydrated state to the hydrated state. Thus, based on the initial request that requested access to only the single feature file (e.g., the "feature_name.exe" file) of the feature, the computing device and the feature provider work together to fully hydrate the entire batch of feature files (even those not yet requested) by writing the entire payload for the feature to a local storage medium. Then, once the entire batch of feature files is fully hydrated (or while the batch is actively being hydrated), the computing device services the request by provisioning access to the requested feature file by using the recently downloaded payload thereof.

These and various other features will be apparent from a reading of the following Detailed Description and a review of the associated drawings. This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with another number included within a parenthetical (and/or a letter without a parenthetical) to refer to each individual item. Generic references to the items may use the specific reference number without the sequence of letters.

DETAILED DESCRIPTION

Figure 1:
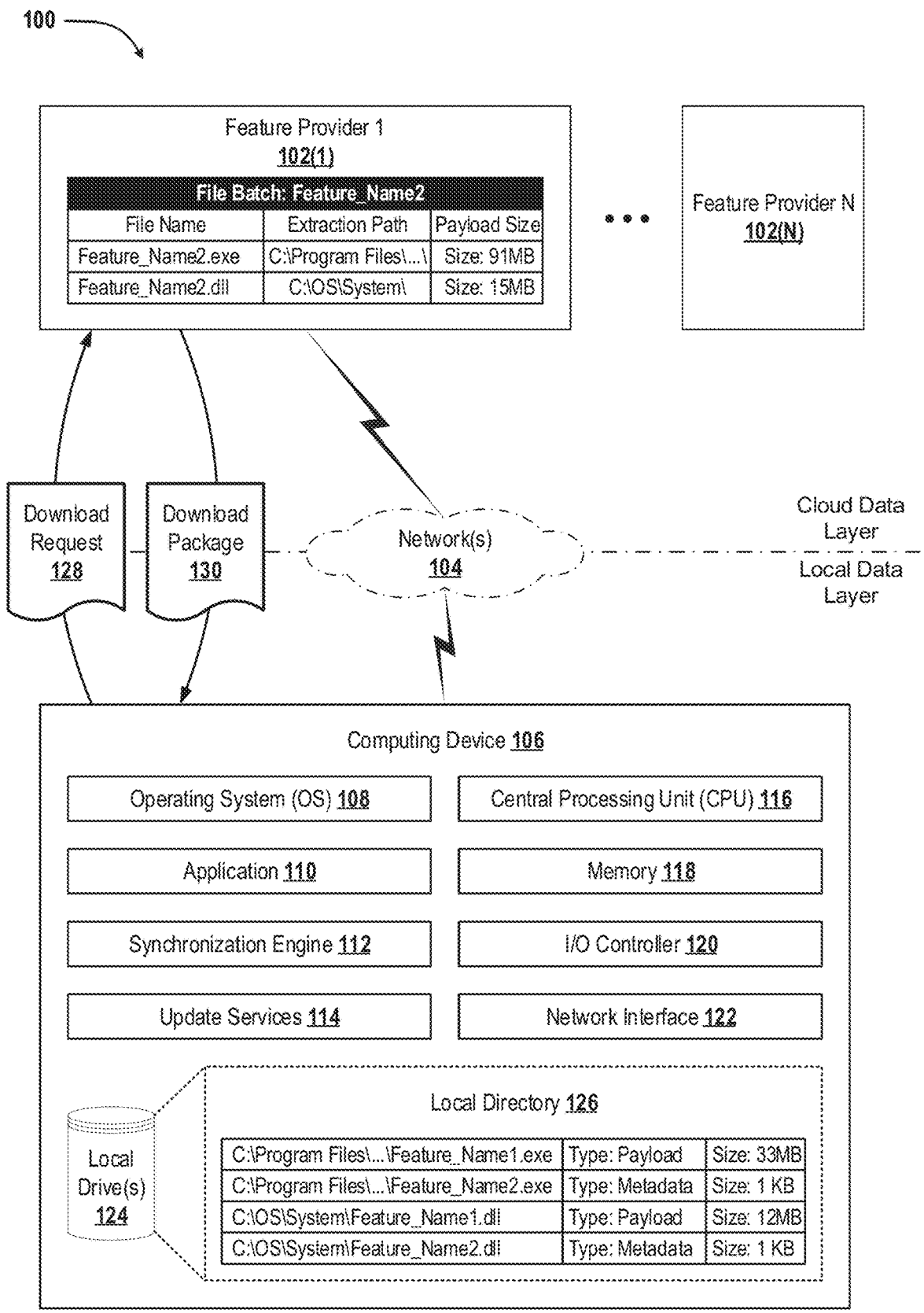
FIG. 1 illustrates an exemplary system for enabling a computing device to store predetermined batches of feature files in a dehydrated state on a local drive while retaining on-demand accessibly of the predetermined batches of feature files at the computing device.

The following Detailed Description describes technologies that enable a computing device to save storage space by foregoing writing the payloads for predetermined batches of feature files to local storage and then automatically downloading payloads for individual batches of feature files as associated features are called upon. Generally described, a computing device may be initially configured with some batches of feature files in a hydrated state and other batches of feature files in a dehydrated state. As a specific example, an operating system (OS) that is running on the computing device may include some features that are frequently used and other features that are rarely used. To conserve storage space, the relative frequencies of use of the various features may be weighed as a factor for selecting some batches of feature files to store on the computing device in a hydrated state and other batches of feature files to leave in a dehydrated state. For example, batches of feature files that enable implementation of frequently used features may be fully hydrated whereas other batches of feature files that enable implementation of rarely used features may be left dehydrated. Then, when a request is received that requests access to an individual dehydrated feature file, the computing device may automatically retrieve, from an appropriate feature provider, a specific batch of feature files that is associated with this dehydrated feature file. After receiving the specific batch of feature files from the appropriate feature provider, the computing device may fulfill the request by providing full access to the feature that is now hydrated but that was previously dehydrated when the request was initially received. In this way, predetermined batches of feature files remain immediately accessible at a computing device without perpetually consuming significant amounts of storage space on the computing device. That is, such predetermined batches of feature files only consume significant storage space if actually called upon in a request—but are otherwise stored as metadata only which does not take up a significant amount of storage space.

As used herein, the term "hydrated" when used to describe a state of an individual feature file indicates that a payload of that individual feature file is stored locally on a computing device. In contrast, the term "dehydrated" when used to describe a state of an individual feature file indicates that a payload of that individual feature file is not stored locally on a computing device. As described in more detail below, in some embodiments, placeholder files are stored on an individual basis for dehydrated feature files in lieu of the full version of these feature files (i.e., payload and all). Exemplary such placeholder files may include metadata that indicates a feature provider from which a corresponding feature file can be readily obtained and/or an address from which the corresponding feature file can be readily obtained. The metadata may also indicate whether a payload associated with the requested feature file is currently written to the local drive.

As used herein, the term "feature" refers to a specific computing functionality that can be performed by a computing device by use of one or more individual feature files and/or batches of feature files. The payloads for individual batches of feature files may be downloaded and written to local storage of a computing device to enable that computing device to support additional feature such as, for example, additional hardware use cases or additional software use cases. As a specific example, a computing device may be equipped with a camera that is suitable for performing facial recognition techniques and a batch of feature files may include software code that enables the computing device to implement such techniques via the camera. Thus, the batch of feature files may include drivers and/or any other suitable type of computer readable instructions that are usable to implement a desired functionality. Exemplary features include, but are not limited to, the wide array of computing functionalities that are available to add or remove from a computing device via the Features on Demand (commonly referred to as "FODs") that are available for use on the MICROSOFT WINDOWS 10 operating system.

As used herein, the term "feature file" refers to any computing file that is usable individually and/or in conjunction with one or more other computing files to enable a functioning computing device (e.g., a general-purpose computer that is executing a typical operating system) to implement a "feature" as defined herein. For example, individual computing files of a group or batch of computing files that enables a general-purpose computer to perform a facial recognition feature may be aptly referred to a feature files.

Turning now to FIG. 1, illustrated is an exemplary system 100 for enabling a computing device 106 to store predetermined batches of feature files in a dehydrated state on a local drive 124 while retaining on-demand accessibility of the predetermined batches of feature files at the computing device 106. In the illustrated example, a first batch of feature files that corresponds to a feature titled "Feature_Name1" is stored in a hydrated state such that a payload of each individual feature file within this first batch is stored on the local drive 124 of the computing device 106. The respective payloads of the individual feature files may include, for example, binaries, permissions, registry settings, and other data that is usable to implement a specific feature. Also shown in the illustrated example, a second batch of feature files that corresponds to a feature titled "Feature_Name2" is stored in a dehydrated state such that placeholder files are stored in place of the actual feature files of this batch. In some embodiments, the placeholder files are stored within a local directory 126 of the computing device 106 at the same path as the actual feature files would be stored if hydrated (e.g., with payload written to local storage) onto the computing device 106. In this way, user interactions with the computing device 106 that result in an actual feature file being called at a specific file path will turn up the actual feature file, if present, or the respective placeholder if the called upon feature file is not hydrated onto the computing device 106. The placeholder files do not include a payload of the associated actual feature files but rather include metadata that indicates properties of the corresponding actual feature files (e.g., the full feature file with corresponding payload). The metadata associated with any particular feature file may indicate a feature provider from which the particular feature file, including the corresponding payload, may be obtained. As described in more detail below, when a particular batch of feature files is in a dehydrated state, the metadata from a placeholder file in this particular batch may be used by the computing device 106 to retrieve the all of the actual feature files for that particular batch on-demand when a single feature file associated with the placeholder file from the batch is requested.

For purposes of adequately conveying the concepts and technical benefits described herein, it may be beneficial to prescribe a data size to the respective payloads for actual feature files and to the metadata for placeholder files. Thus, as illustrated, the second batch of files includes two actual feature files that are named "Feature_Name2.exe" and "Feature_Name2.dll" with payloads of 91 MB and 15 MB, respectively (shown in the cloud data layer on the feature provider 102(1)). As further illustrated, the two placeholder files corresponding to these two actual files are a mere 1 KB each (shown in the local data layer on the local drive 124). Thus, under these specific but nonlimiting circumstances, the second batch of feature files will consume a mere 2 KB of local storage space when stored in a dehydrated state in contrast to 106 MB of local storage space when stored in a hydrated state.

As illustrated, the computing device 106 may include an operating system (OS) 108 that is installed onto a local drive 124. To facilitate operation of the computing device 106, at least some batches of feature files that are usable to implement various "core" and/or frequently used features of the OS 108 may be fully hydrated on the computing device 106. To reduce the overall amount of storage space that is consumed on the computing device 106, at least some other batches of feature files that are usable to implement other features of the OS 108 are left dehydrated on the computing device 106—unless called upon as described below. The OS 108 may be any suitable system software for managing computer hardware and/or software resources and for providing services to various application(s) 110. An exemplary OS 108 may include, but is not limited to, various versions of MICROSOFT WINDOWS (e.g., WINDOWS 8.1 or 10, WINDOWS EMBEDDED STANDARD 7, etc.) and/or various versions of macOS (e.g., macOS SIERRA, macOS X, etc.), and/or various versions of Chrome OS.

The computing device 106 may further include an application 110 that is installed onto the local drive 124. In some embodiments, at least some batches of feature files that are usable to implement various features of the application 110 may be stored on the local drive 124 in a dehydrated state. In particular, it should be appreciated that the techniques described herein are usable to reduce the software footprint of the OS 108 and/or the application 110. This reduction in the software footprint is accomplished by selectively storing individual batches of feature files which are usable to implement select features of the OS 108 and/or the application 110 in a dehydrated state. Configuring the computing device 106 according to the techniques described herein enables users and/or software components to issue requests (e.g., call upon) for dehydrated feature files and to have these requests serviced just as if the dehydrated feature files were fully hydrated at the time when the request was generated. This is accomplished by automatically hydrating the requested feature files (and in some embodiments other commonly batched feature files) immediately upon receiving a request. Then, following this intermediary step of hydrating the requested feature files, the computing device 106 may then respond to the request by provisioning access to the payload of the newly hydrated feature file. That is, the computing device 106 receives the request when the payload is not locally available and slightly delays responding to the request until after having downloaded and/or written the payload to the local drive 124.

In some implementations, the computing device 106 may utilize a synchronization engine 112 for retrieving download packages when requests are issued that seek access to feature files that are currently dehydrated on the computing device 106. For example, when the OS 108 receives a request that identifies a specific feature file that is currently dehydrated, the OS 108 may retrieve metadata that is stored in a placeholder file for the specific feature file. The OS 108 may then provide the metadata to the synchronization engine 112 to cause a download request 128 to be transmitted to a feature provider 102(1) that is associated with the specific feature file. As described above, the metadata that is stored in the placeholder file may include an identification of which feature provider (of numerous potential feature providers) from which the requested feature file can be obtained. As used herein, the term "metadata" refers specifically to a set of data that provides information about a corresponding feature file and, more particularly, about how the computing device 106 can acquire a payload associated with the corresponding feature file. In some embodiments, the metadata may also indicate whether the payload for the requested feature file is currently written to the local drive of the computing device. Stated alternatively, the metadata may include an indication of whether or not the feature file that is specifically requested is currently hydrated at the computing device.

The download request 128 may include an identification of the requested feature file for which access has been requested. In some instances, the download request 128 may omit any specific identification of the other feature files—such as those that are commonly batched with the requested feature file. For example, the request may be generated based on a user entering a run command to start a currently dehydrated feature and/or application by accessing an associated executable (e.g., ".exe") file. In this example, the run command may specifically reference the file named "Feature_Name2.exe" without referencing the related file named "Feature_Name2.dll." Thus, this run command may cause the OS 108 to generate a request for access to the file named "Feature_Name2.exe." In response to the request, the synchronization engine 112 may generate a download request 128 for this specifically requested feature file only but does not request the related file named "Feature_Name2.dll"—even though this these files are commonly batched. One reason that the synchronization engine 112 might not identify all of these commonly batched feature files in the download request 128 is that the various components of the computing device 106 may lack visibility as to which files are batched together. For example, the OS 106 may be designed to simply fulfill requests on a file-by-file basis and the requested feature files may omit indications as to any relationships to other files they may have. Exemplary synchronization engines 112 include, but are not limited to, SYNC API developed by DROPBOX, BACKUP AND SYNC developed by GOOGLE, and the ONEDRIVE UNIVERSAL WINDOWS PLATFORM (UWP) APP for MICROSOFT'S WINDOWS 10. Accordingly, it can be appreciated that the synchronization engine 112 may be a native component of the OS 108 or may be an add-on component that is downloaded and installed onto the client device 106 separately from the OS 108.

Upon receiving the download request 128, the first feature provider 102(1) may identify an entire predefined batch of feature files to which the requested feature file belongs. For example, as illustrated, the first feature provider 102(1) may determine that the requested feature file (e.g., the file named "Feature_Name2.exe") belongs to a batch of feature files named "File Batch: Feature_Name2"). Then, rather than returning merely the requested feature file, the first feature provider 102(1) may return a download package 130 that includes the entire identified batch of feature files. Thus, in the illustrated example, in response to the download request 128 identifying the single file named "Feature_Name2.exe," the first feature provider 102(1) returns both of the requested "Feature_Name2.exe" file and also the "Feature_Name2. dll" file—and any other feature files that are commonly batched. In some embodiments, the first feature provider 102(1) may return the download package 130 in the form of a compressed archive file to increase the speed at which the entire batch of feature files becomes hydrated on the computing device 106. Since while implementing the desired feature the computing device 106 is likely going to request access to the other feature files within a batch, delivering the download package 130 as a compressed archive folder also decreases the overall network bandwidth that would otherwise be consumed if each feature file were individually delivered as requested by the computing device 106.

Upon receipt of the download package 130, the computing device 106 may write each of the individual feature files onto the local drive 124 (e.g., a hard disk, a solid-state hard drive, or any other suitable volatile or non-volatile storage medium) in order to convert the individual feature files from the dehydrated state into the hydrated state. In some embodiments, once the entire batch of feature files is fully hydrated (or while the batch is actively being hydrated), the computing device 106 services the request by provisioning access to the requested feature file by using the newly downloaded payload thereof. Alternatively, the computing device 106 may service the request by provisioning access to the newly downloaded payload of the requested feature file even before the payload is written to the local drive 124. For example, the request may be serviced by directly loading the payload from the download package into a memory or cache of the computing device 106.

In some implementations, the computing device 106 further includes update services 114 that are configured to automatically update various components such as, for example, the OS 108 and/or the application 110. For example, as new versions of the OS 108 and/or application 110 become available from a corresponding provider, the update services 114 may download the installation files (e.g., a cabinet file having the ".cab" extension) and then install the already downloaded installation files at an appropriately scheduled time (e.g., during off-peak usage). In some embodiments, the update services 114 are further configured to automatically update the metadata that corresponds to specific dehydrated features when updates to the dehydrated features become available from a feature provider 102. For example, the update services 114 may periodically communicate with the feature provider(s) 102 for the various features that are currently dehydrated on the computing device 106 to determine when new version(s) of the feature files become available. Then, as the new version(s) of the feature files become available, the update services 114 may update the metadata that is stored in the placeholder for the feature files so that the "updated" metadata now indicates how to obtain the updated feature files and updated payloads thereof. For example, the metadata may be undated so that the previous addresses in the metadata that indicated where to download the previous version of the feature files are overwritten with new addresses that indicate where to download the new versions of the feature files.

As further illustrated, the computing device 106 includes a central processing unit ("CPU") 116 that is connected, via a bus (not shown in FIG. 1), to various components such as the local drive 124, a memory 118, an input/output (I/O) controller 120, and/or a network interface 122. It can be appreciated that the system components described herein (e.g., the application(s) 110, the OS 108, and/or the synchronization engine 112) may, when loaded into the CPU 116 and executed, transform the CPU 116 and the overall computing device 106 from a general-purpose computing system into a special-purpose computing system customized to facilitate the functionality presented herein. The CPU 116 may be constructed from any number of transistors or other discrete circuit elements, which may individually or collectively assume any number of states. More specifically, the CPU 116 may operate as a finite-state machine, in response to executable instructions contained within the software modules disclosed herein. These computer-executable instructions may transform the CPU 116 by specifying how the CPU 116 transitions between states, thereby transforming the transistors or other discrete hardware elements constituting the CPU 116.

The local drive 124 and associated computer-readable media provide non-volatile storage for the computing device 106. Although the description of computer-readable media contained herein refers to a mass storage device, such as a solid-state drive and/or a hard disk, it should be appreciated by those skilled in the art that computer-readable media can be any available computer storage media or communication media that can be accessed by a computing architecture such as, for example, the system 100. Communication media includes computer-readable instructions, data structures, program modules, and/or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, RF, infrared and other wireless media. Combinations of the any of the above are also included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computing device 106. For purposes of the claims, the phrase "computer storage medium," "computer-readable storage medium," and variations thereof, does not include waves, signals, and/or other transitory and/or intangible communication media, per se.

The I/O controller 120 may receive and process input from a number of other devices, including a keyboard, mouse, or electronic stylus (not shown in FIG. 1). Similarly, the I/O controller 120 may provide output to a display screen (e.g., to display the file-browser GUI described herein), a printer, or other type of output device (also not shown in FIG. 1). The network interface 122 may enable the computing device 106 to connect to one or more network(s) 104 such as a local area network (LAN), a wide area network (WAN), a wireless local area network (WLAN), or any other suitable network for passing information between the computing device 106 and the feature provider(s) 102.

Figure 2A:
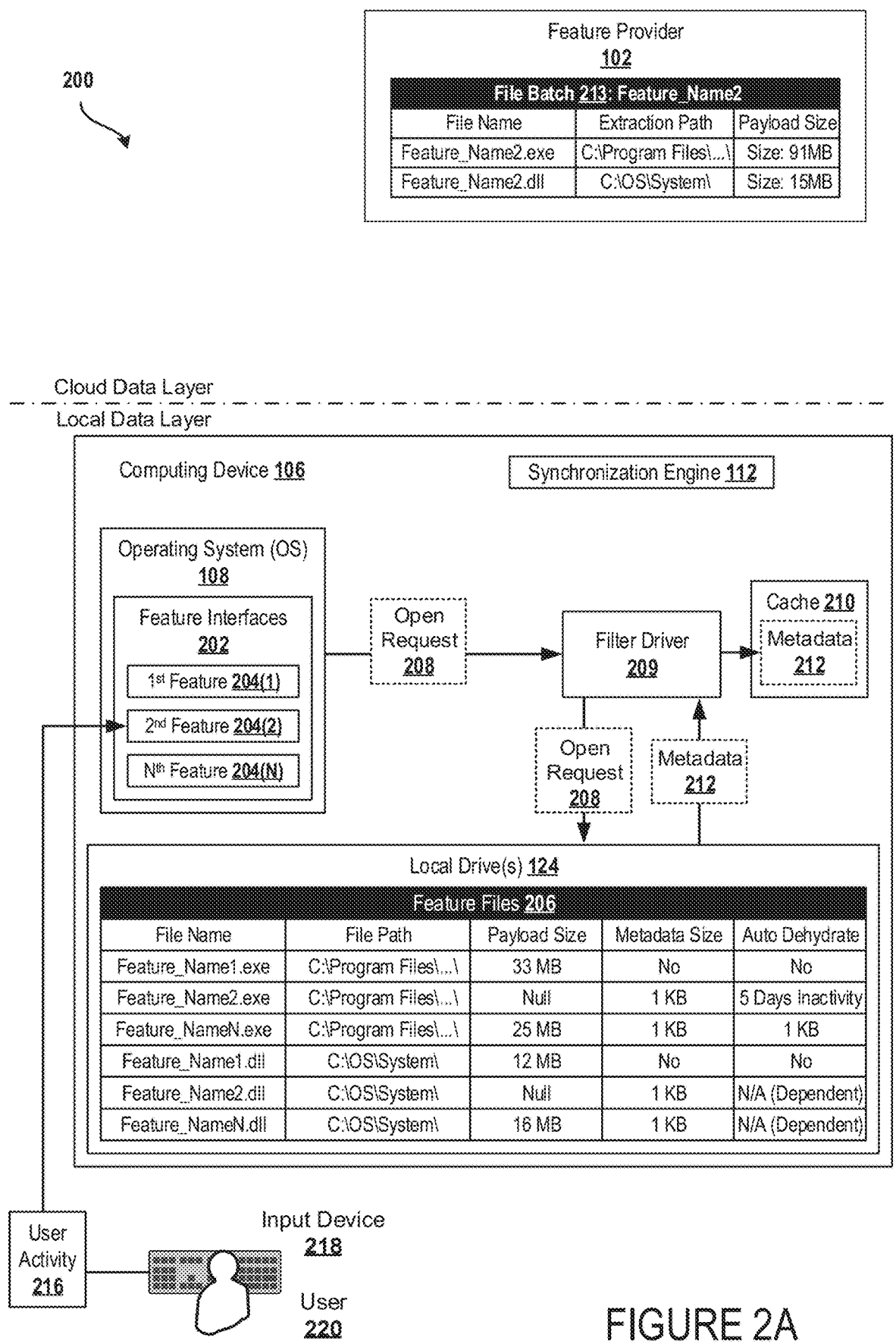
FIG. 2A illustrates an exemplary dataflow scenario in which the computing device performs an open request for a requested feature file that is currently stored on a local drive in a dehydrated state.

Turning now to FIG. 2A, an exemplary dataflow scenario 200 is illustrated in which the computing device 106 performs an open request 208 a requested feature that is currently stored on the local drive 124 in a dehydrated state. As illustrated, the computing device 106 may receive user activity 216 that is generated based on a user 220 interacting with an input device 218 (e.g., a keyboard, a mouse, a touchscreen, a microphone, or any other suitable input component). The user 220 may perform the user activity 216 via the input device 218 to request access to the various features 204 of the OS 108—regardless of whether those features are currently hydrated on the computing device 106. As illustrated, the OS 108 includes feature interfaces 202 that are usable to access each of a first feature 204(1) through an Nth feature 204(N). In various embodiments, the feature interfaces 202 may represent one or more application programming interfaces (APIs) that are usable to call upon a set of subroutines that are usable to implement a desired functionality of the OS 108.

In various embodiments, the feature interfaces 202 may be represented (e.g., graphically displayed) by the computing device 106 to the user 220 in a consistent manner for individual features 204 regardless of whether those individual features are currently hydrated on the computing device 106. For example, a particular one of the feature interfaces 202 may be designed to expose a button to the user 220 that is selectable to cause the computing device 106 to implement a particular functionality (e.g., translating a message body from a current dialect into a desired dialect). The feature interfaces 202 may cause this button to be exposed to the user 220 even when the underlying feature 204 that performs the particular functionality is dehydrated on the computing device 106. That is, the button is exposed to and/or is selectable by the user 220 even if the payloads for the feature files 206 that actually enable the computing device 106 to perform the particular functionality is not present in the local drive 124.

For purposes of FIG. 2A, the state of the computing device 106 is such that the feature interfaces 202 expose representations of a first feature 204(1), a second feature 204(2), and an Nth feature 204(N). The state of the computing device 106 is further implemented such that the first feature 204(1) and the Nth feature 204(N) are fully hydrated on the computing device 106. For example, as illustrated, a plurality of feature files 206 that enable implementation of the first feature 204(1) and the Nth feature 204(N) are shown to be written to the local drive(s) 124. Specifically, each of the feature files named "Feature_Name1.exe," "Feature_NameN.exe," "Feature_Name1.dll," and "Feature_NameN.dll" are shown as having their payloads fully written to the local drive 124. Individual ones of the feature files 206 may include various properties such as a file name, a file path, a payload size, a metadata size, and/or an auto-dehydrate parameter. For purposes of the present discussion, values are prescribed for each of these properties in a table that extends downward from the black feature file box that is labeled 206. These values are used solely to convey aspects of the present disclosure and are not intended to be limiting in any way.

In the illustrated example, the hydrated status of the first feature 204(1) results in 33 MB of storage being consumed to store the feature file named "Feature_Name1.exe," and also an additional 12 MB of storage being consumed to store the feature file named "Feature_Name1.dll." As further illustrated, some additional 41 MB of storage is consumed in order to retain a hydrated status of the Nth feature 204(N). In contrast to the first and Nth features, the second feature 204(2) is dehydrated in the state of the computing device 106 illustrated in FIG. 2A. That is, the individual feature files 206 that uniquely correspond to the second feature 204(2) are shown to be in a dehydrated state such that the payloads of these feature files are not stored locally on the local drive(s) 124. Thus, as illustrated, even though the second feature 204(2) is implemented using a batch of two feature files that together would require an allocation of 106 MB of local drive space to be fully hydrated on the computing device 106, these feature files are stored locally in a dehydrated state that omits the actual payloads but includes metadata with information that is usable to obtain the payloads if requested. These dehydrated feature files may serve as placeholders to the hydrated feature files (e.g., that include the payloads) and the metadata may indicate a feature provider from which the corresponding hydrated feature files can be readily obtained and/or an address from which the corresponding hydrated feature files can be readily obtained. In the illustrated embodiment, the fully hydrated feature files are stored by a feature provider 102 as part of a file batch that uniquely corresponds to the second feature 204(2).

With respect to the specific data flow scenario 200 illustrated in FIG. 2A, the user activity 216 that is received in association with the feature interfaces 202 results in a series of interactions between various components of the computing device 106 and the feature provider 102. For example, as illustrated, the user activity 216 results in an open request 208 being transmitted from the OS 108 to a filter driver 209. For purposes of the present discussion, presume that the open request 208 is requesting data associated with the feature file named "Feature_Name2.exe." The filter driver 209 may be a file system driver such as, for example, the "cldflt.sys" driver that is commonly deployed in conjunction with Microsoft's OneDrive. As described above, the feature files 206 include both fully hydrated feature files and dehydrated feature files (e.g., placeholder files). The filter driver 209 assists with handling requests for access to the various feature files that are stored in the local drive 124. For example, as illustrated, when a user performs some computing action that causes generation of an open request 208 in association with a particular feature file, the filter driver 209 passes the open request 208 through to the local drive 124. In some embodiments, the open request 208 may include a reparse point that tags one or more fields of metadata 212 associated with the requested file. The reparse point may inform the filter driver 212 of which field of the metadata is indicative of the hydration status of the requested feature file. For example, the filter driver 209 may query the local drive 124 for data associated with the requested feature file based on the open request 208. If the payload for the requested feature file is stored locally on the local drive 124, then the filter driver 209 may simply service the open request 208 as normal. In contrast, if the filter driver 209 queries the local drive 124 and determines that the requested feature file is dehydrated such that the payload is not available from the local drive 124, then the filter driver 209 may obtain the metadata 212 that is stored in association with the dehydrated file and store this metadata 212 in a cache 210.

Figure 2B:
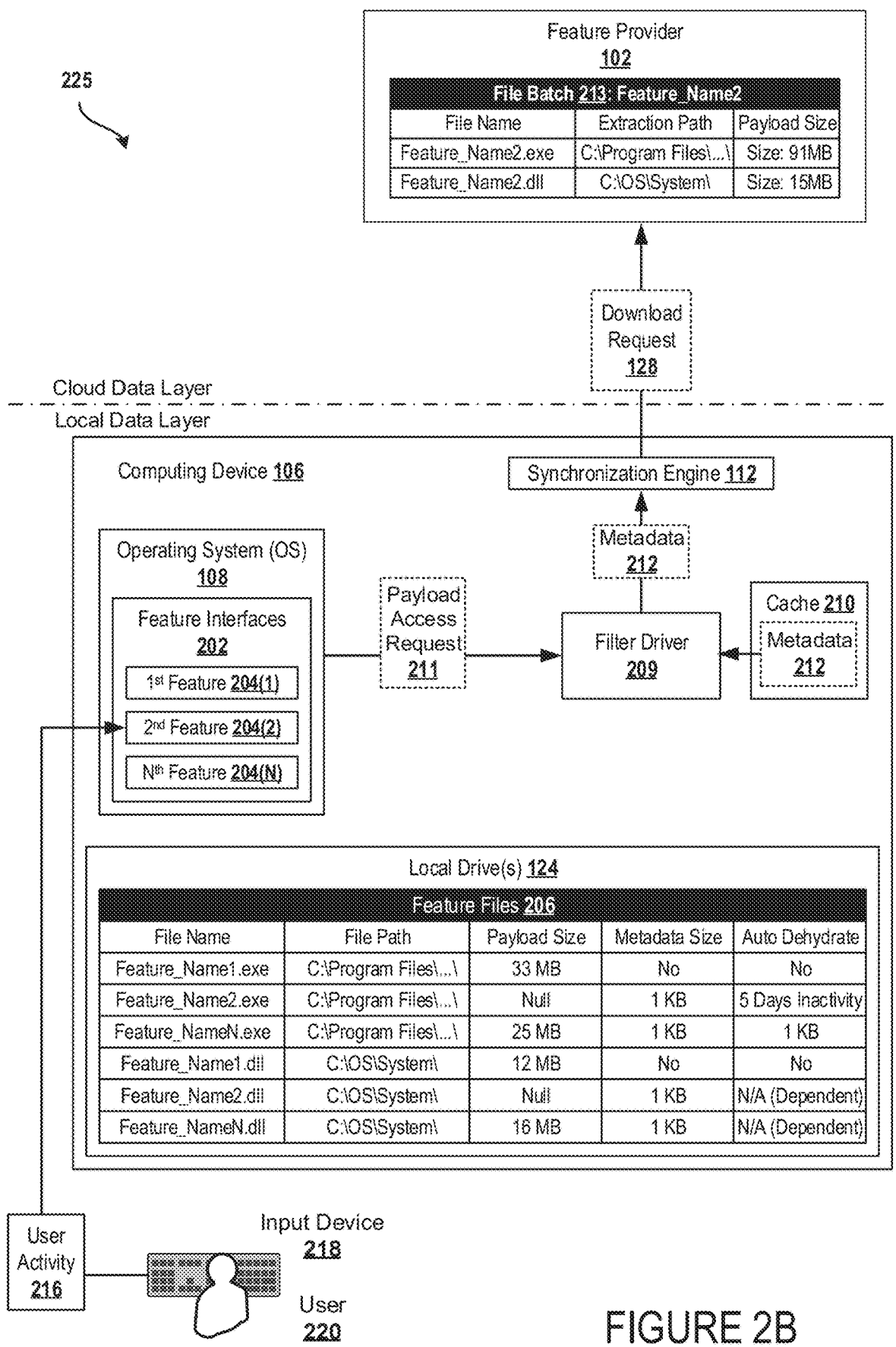
FIG. 2B illustrates an exemplary dataflow scenario in which the computing device responds to a read and/or write request by transmitting a download request to an appropriate feature provider.

Turning now to FIG. 2B, illustrated is an exemplary dataflow scenario 225 in which the computing device responds to a payload access request 211 by transmitting a download request 128 to an appropriate feature provider. As illustrated, after the filter driver 209 having already cached the metadata 212 responsive to the open request 208, the OS 108 then transmits the payload access request to the filter driver 209. An exemplary payload access request 211 may be a read request associated with the requested feature file (e.g., the OS may request to read some portion of the payload for the requested feature file). As another example, the payload access request 211 may be a write request associated with the requested feature file (e.g., the OS may request to write data to some portion of the payload for the requested feature file).

Responsive to the payload access request 211, the synchronization engine 112 may then generate a download request 128 based on the metadata 212. In some embodiments, the metadata 212 may include an address from which the requested feature file can be obtained. Additionally, or alternatively, the metadata 212 may indicate an appropriate feature provider from which the requested feature file can be obtained. For example, as described above, the request 208 is requesting access to the feature file named "Feature_Name2.exe." Therefore, the download request 128 may include an identifier of the particular feature provider 102 that is shown in FIG. 2A since this particular feature provider 102 may provide access to the file batch 213 that is entitled "Feature_Name2." In some embodiments, the download request 128 is transmitted to the feature provider 102 in response to the first payload access request 211 that is received following the initial open request 208 that resulted in the caching of the metadata 212. It will be appreciated that such embodiments may reduce unnecessary network traffic because under a variety of circumstances an open request 208 may be received that requests data associated with file properties only without any subsequent request for actual access to the payload ever being issued. Thus, some embodiments may refrain from hydrating feature files upon receipt of a corresponding open request but rather will wait until a payload access request is received.

Figure 2C:
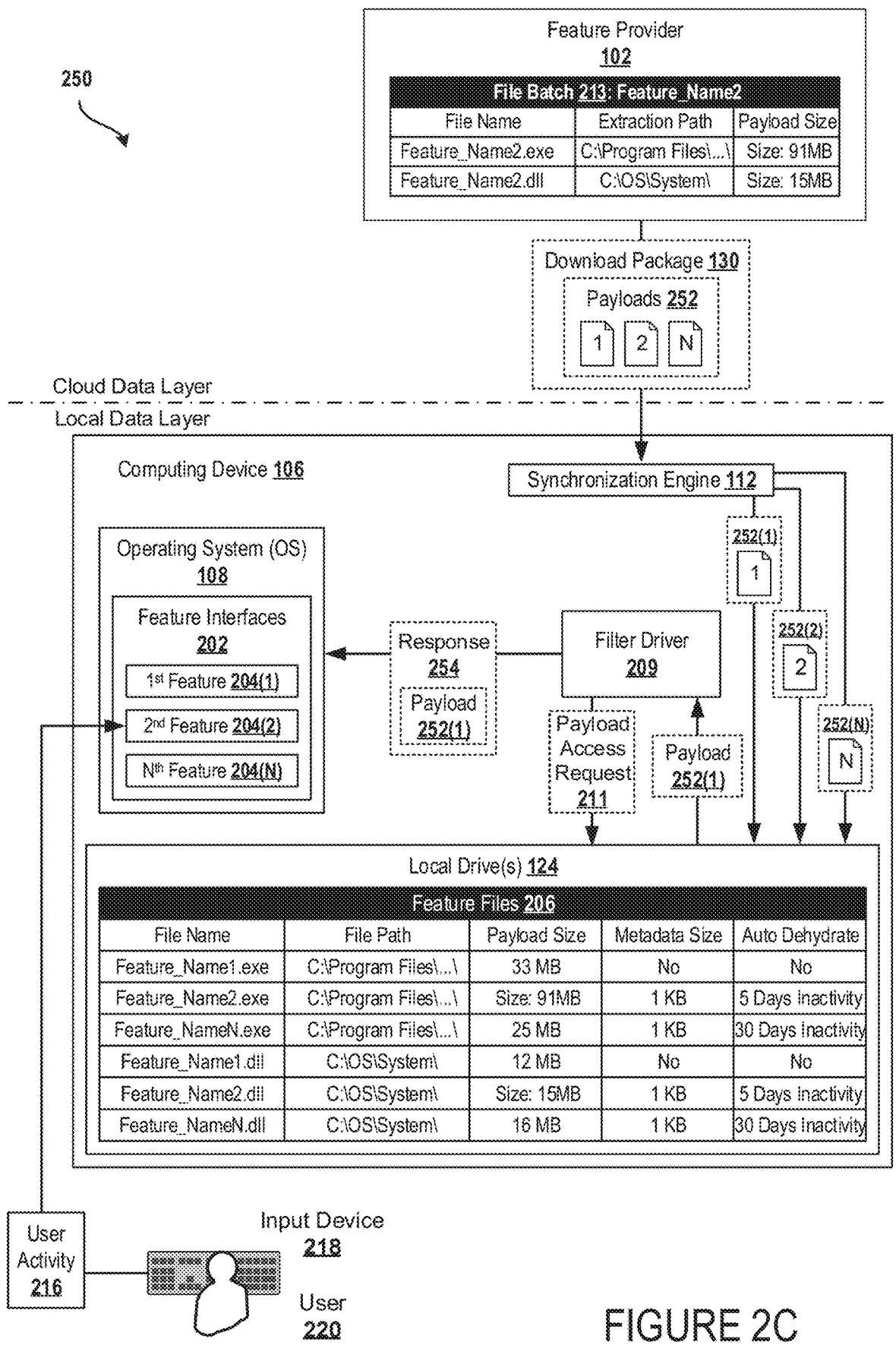
FIG. 2C illustrates an exemplary dataflow scenario in which the computing device responds to the read and/or write request of FIG. 2B after having downloaded and hydrated the requested feature file.

Turning now to FIG. 2C, an exemplary dataflow scenario 250 is illustrated in which the computing device 106 responds to the payload access request 211 of FIG. 2B after having intermediately downloaded and hydrated the requested feature file by obtaining and writing the corresponding payload to the local drive 124. As illustrated, the computing device 106 receives a download package 130 from the feature provider 102. The download package 130 is provided in response to the download request 128. Furthermore, the download package 130 may include an entire batch of files to which the requested feature file belongs. For example, in the present example, presume that the download request 128 identifies "Feature_Name2.exe" as being the particular file that is being immediately requested in the request 208. Under these circumstances, the feature provider 102 may identify the file named "Feature_Name2.exe" as being a part of the file batch 213 that is entitled "Feature_Name2." Then, rather than returning merely the requested feature file, the feature provider 102 may return the entire File Batch 213 within the download package 130. Under the present circumstances, since the download request 128 identifies the "Feature_Name2.exe" file, then the feature provider 102 may retrieve not only the "Feature_Name2.exe" file but also the "Feature_Name2.dll" file and/or any of parts of the payload for the $2^{nd}$ feature 204(2) that is currently dehydrated on the computing device. Then, the feature provider 102 responds to the download request 128 for the single file by providing a download package 130 that includes all feature files from the entire predefined batch of feature files 206. In the illustrated embodiment, the download package 130 includes $1^{st}$ through Nth payloads 252.

Upon receiving the download package 130, the synchronization engine 112 writes the payloads for the individual feature files within the file batch 213 to the local drive 124. For example, the computing device 106 and/or synchronization engine 112 may decompress the download package 130 and write each of the included feature files onto the local drive 124 (e.g., a hard disk, a solid-state hard drive, or any other suitable volatile or non-volatile storage medium) in order to convert these feature files from the dehydrated state to the hydrated state. Thus, based on the initial request 208 that requested access to only the single feature file (e.g., the "Feature_Name2.exe" file) of the file batch 213, various system components such as the filter driver 209, the synchronization engine 112, and the feature provider 102 work together to fully hydrate the entire batch of feature files (even those not yet requested) by downloading and then locally storing all of their corresponding payloads. Then, once the entire batch 213 of feature files is fully hydrated (or while the batch is actively being hydrated), the computing device 106 services the request 208 by providing a response 254 to the OS—where the response 254 provides access to the payloads 252 that are newly downloaded to the computing device and written to the local drives 124 thereof.

In some embodiments, an entire payload for the requested feature file may be fully hydrated in response to an initial receipt of any payload access request. In this way, as soon as any portion of a payload is requested for a particular feature file, the entire payload then becomes fully hydrated and available from the local drive. In other embodiments, specific portions of a payload for the requested feature file may be hydrated onto the local drive incrementally as numerous incremental payload access requests are received. For example, a first payload access request may be received that requests access to a specific portion of the payload for the requested feature file. This first payload access request may trigger the hydration of one or more other portions of the payload that are proximate to the requested portion. For example, if the requested feature file is a map file that defines various rooms in a map of a three-dimensional first person perspective video game, then a payload access request for a portion of the payload that defines a specific room may trigger the hydration of other portions of the payload that define adjacent rooms. In this way, if the player walks from the specific room into any other adjacent room, then the data needed to render the appropriate adjacent room is fully hydrated and ready to use from the local drive.

As illustrated in FIGS. 2A-2B, in some embodiments, the metadata 212 that is usable for identifying and contacting an appropriate feature provider 102 from which individual feature files 206 can be obtained is stored on the local drive 124 even for fully hydrated feature files. In this way, individual feature files 206 can be converted from a hydrated state to a dehydrated state simply by deleting the associated payload from the local drive 124. In this way, dehydrating individual feature files does not require the computing device 106 to communicate with the feature provider 102 to obtain and store metadata 212. Rather, the metadata 212 can in some embodiments be permanently stored on the computing device 106 so that in the event that the payloads 252 are corrupted or deleted (inadvertently or intentionally), the computing device 106 retains the ability to cause the filter driver 209 and the synchronization engine 112 to work together to obtain and fully hydrate any desired feature files 206.

In some embodiments, individual ones of the feature files 206 include an auto-dehydrate parameter that indicates one or more conditions under which the computing device 106 is to deallocate storage capacity of the local drive 124 from the payload 252 for any particular feature file 206. In some instances, deallocating storage capacity for a payload 252 may include actually deleting the payload from the local drive 124. In some instances, deallocating storage capacity for a payload 252 may include permitting the computing device 106 to overwrite storage capacity that is currently used to store the payload 252. As illustrated, for example, the feature files 206 may be associated with auto-dehydrate parameters that restrict the individual files from being dehydrated or, alternatively, set a time period of inactivity after which the individual files are to be dehydrated. For example, the feature files 206 that are associated with the $1^{st}$ feature 204(1) have an auto-dehydrate parameter of "No" that restricts these feature files 206 from being dehydrated. Such a parameter may be suitable for "core" OS features or any other feature or feature files thereof that are to remain permanently hydrated on the computing device 106. As another example, the feature files 206 associated with the $2^{nd}$ feature 204(2) and the Nth feature 204(N) each have a corresponding auto-dehydrate parameter that sets a time period of inactivity after which these feature files are to be dehydrated on the computing device 106. In the specific but non-limiting example illustrated in FIGS. 2A-2B, the feature file entitled "Feature_Name2.exe" will be automatically dehydrated if 5 days pass without it being accessed. Such a parameter may be suitable for feature files that correspond to a seldom used feature so that these feature files are automatically hydrated when called upon and then automatically dehydrated if unused for the prescribed time period (e.g., 5 days in this example).

Figure 3:
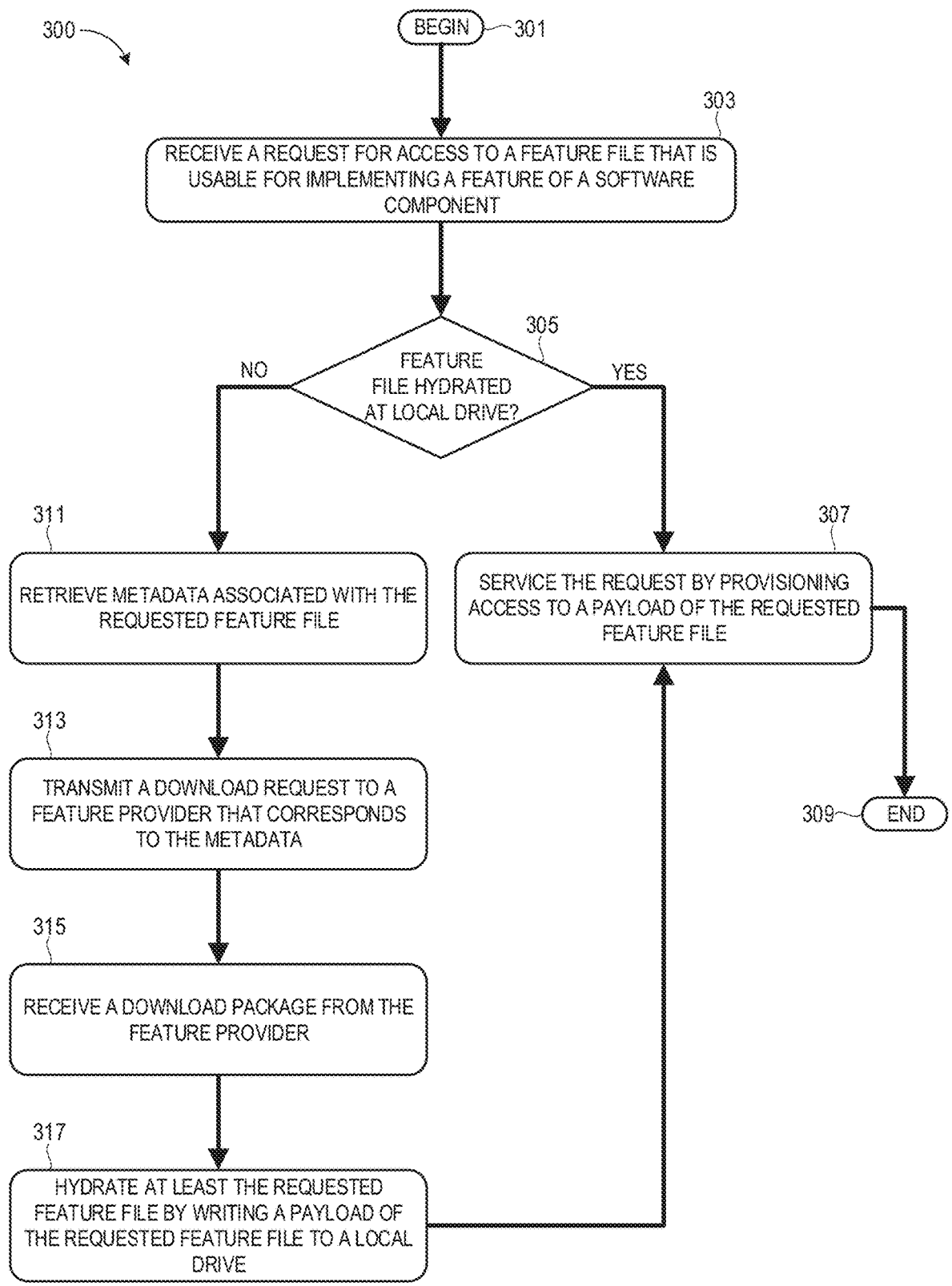
FIG. 3 is a flow diagram of an example method for dynamically hydrating individual feature files or batches of feature files onto a local drive of the computing device as called upon by a software component at the computing device.

FIG. 3 is a flow diagram of an example method 300 for dynamically hydrating individual feature files or batches of feature files onto a local drive of a computing device as called upon by a software component at the computing device. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

At block 301, the example method 300 begins.

At block 303, a system (e.g., the computing device 106) receives a request for access to a feature file that is usable for implementing a feature of a software component. For example, as described in relation to FIGS. 1-2B, an operating system (OS) 108 may be executing on the computing device 106 to manage computer hardware and/or software resources. The OS 108 may also provide services to various applications 110 that are installed and/or executing on the computing device 106. In some embodiments, the request may be generated in association with a feature interface 202 of the OS 108 and/or the application 110. Feature interfaces 202 may be represented (e.g., displayed) by the computing device 106 to the user 220 in a consistent manner for individual features 204 regardless of whether those individual features are currently hydrated on the computing device 106. For example, a particular one of the feature interfaces 202 may be designed to expose a button to the user 220 that is selectable to cause the computing device 106 to implement a particular functionality (e.g., translating a message body into a desired dialect)—even when the underlying feature 204 that performs the particular functionality is dehydrated on the computing device 106. That is, the button is exposed to and/or is selectable by the user 220 even when the payload for the feature files 206 that actually enables the computing device 106 to perform the particular functionality is not present in the local drive 124.

At block 305, the system may determine whether the requested feature file is currently hydrated onto the local drive 124 of the computing device 106. For example, as described above, upon receiving a request 208 for a particular feature file, the system (or a component thereof) may perform a hydration check 210 with respect to the particular feature file on the local drive 124. As a specific but non-limiting example, a filter driver 209 on the computing device 106 may query the local drive 124 for the requested feature file and determine whether the corresponding payload is available.

If the system determines that the requested feature file is hydrated onto the computing device 106, then the exemplary method 300 may proceed to block 307 at which the system services the request by provisioning access to the payload of the requested feature file. For example, as illustrated in FIG. 2B, the filter driver 209 may respond to the request 208 with a response 254 that includes any requested payloads of the feature files. It will be appreciated that since the payload is already present on the computing device 106, the request may be immediately serviced without the intermediary step of hydrating the requested feature file. Once the request is serviced, the example method 300 ends at block 309.

In contrast, if the system determines that the requested feature file is not hydrated onto the computing device 106, then the exemplary method 300 may proceed from block 305 to block 311 at which metadata associated with the requested feature file is retrieved from the local drive 124. As described above, the metadata 212 may include an address from which the requested feature file can be obtained and/or an indication of an appropriate feature provider 102 from which the requested feature file can be obtained.

At block 313, the system may transmit a download request 128 to a feature provider 102 that corresponds to the metadata 212. For example, the system may deploy a synchronization engine 112 to generate the download request based on the metadata. The synchronization engine 112 may transmit the download request to the feature provider to obtain the requested feature file and/or an entire batch of feature files to which the requested feature file belongs.

At block 315, the system receives the download package 130 from the feature provider 102. The download package 130 includes at least the payload that corresponds to the requested feature file. In some embodiments, the download package 130 includes the payload for only those feature files that are requested at block 303. In some embodiments, the download package 130 includes an entire batch of feature files—at least some of which were not requested at block 303.

At block 317, the system hydrates at least the particular feature file requested at block 303 by writing the payload for this particular feature file to the local drive 124. In some embodiments, the download package 130 includes payloads for an entire batch of feature files to which the requested feature file belongs. Then, after having hydrated at least the requested feature files (and any other feature files) provided in the download request, the exemplary method 300 proceeds from block 317 to block 307 at which the system services the request by provisioning access to the payload of the requested feature file—which has been hydrated onto the computing device since having initially received the request at block 303. For example, as illustrated in FIG. 2B, the filter driver 209 may respond to the request 208 with a response 254 that includes any requested payloads of the feature files. Once the request is serviced, the example method 300 ends at block 309.

Figure 4:
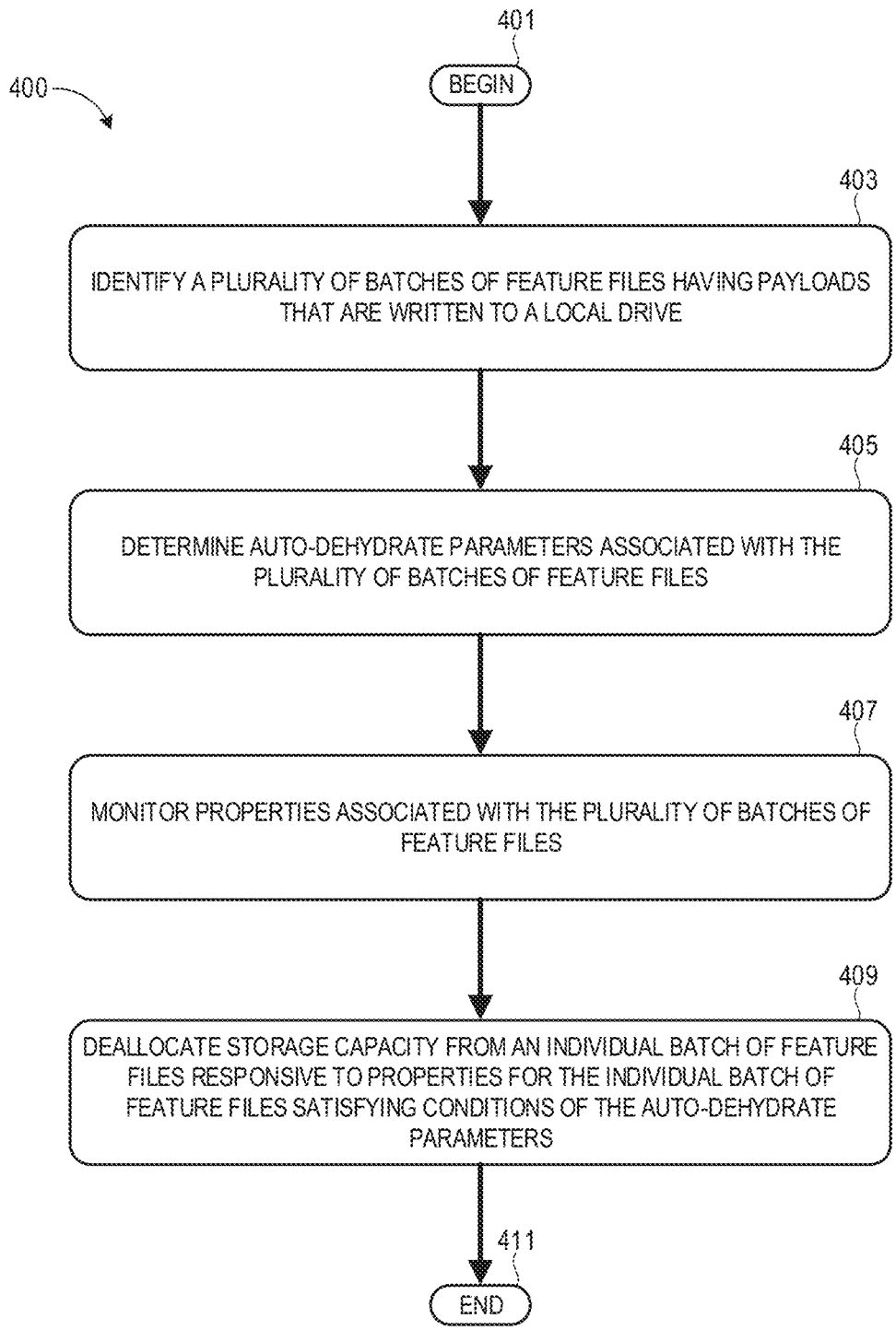
FIG. 4 is a flow diagram for monitoring properties associated with individual feature files or batches of feature files to dynamically dehydrate the individual feature files or the batches of feature files when auto-dehydrate parameters are satisfied.

Turning now to FIG. 4, illustrated is a flow diagram 400 for monitoring properties associated with individual feature files or batches of feature files to dynamically dehydrate the individual feature files or the batches of feature files when auto-dehydrate parameters are satisfied.

At block 401, the example method 400 begins.

At block 403, a system (e.g., the computing device 106) identifies a plurality of batches of feature files that have payloads that are written to a local drive. By virtue of the payloads being stored locally, the plurality of batches of feature files may take up a substantial amount of storage space on the local drive. However, as described above, the importance of having any individual batch of feature file remain hydrated on the device may vary as compared to other individual batches of feature files. For example, a first batch of feature files may enable implementation of a frequently used functionality of an operating system (OS). In contrast, a second batch of feature files may enable implementation of a seldom used functionality of the OS. In this example, it can be appreciated that the importance of locally storing the payload(s) for the first batch of feature files may be relatively higher than the importance of locally storing the payload(s) for the second batch of feature files.

At block 405, the system may determine auto-dehydrate parameters associated with the plurality of batches of feature files. As described above, the auto-dehydrate parameters may prescribe a time period of inactivity after which individual feature files or batches of feature files are to be dehydrated from a local drive on the computing device 106. For example, an auto-dehydrate parameter of 5 days being prescribed in association with a particular feature file may result in a payload for this particular feature file being deleted from the local drive after the designated auto-dehydrate parameter has been met.

At block 407, the system monitors properties associated with the plurality of batches of feature files. Exemplary properties that the system can monitor include, but are not limited to, usage frequency properties that indicate a frequency with which the individual feature files are used at the computing device, last usage properties that indicate a period of time that has elapsed since the individual feature files have been used, and so on. As a specific example, the system may monitor a "Accessed" property as is available in various versions of the MICROSOFT WINDOWS operating system.

At block 409, the system deallocates storage capacity from an individual batch of feature files in response to the properties monitored at block 407 for the individual batch of feature files satisfying conditions of the auto-dehydrate parameters. As a specific example, if the auto-dehydrate parameter prescribes 5 days-worth of inactivity as a condition that is to result in a particular feature file or batch of feature files being dehydrated, then the system may deallocate storage capacity for the particular feature file or batch of feature files responsive to 5 days passing since the particular feature file was last accessed. Once the storage capacity for the feature file(s) is dehydrated, the example method 400 ends at block 411. Of course, following the completion of the method 400, the feature file(s) may be rehydrated on demand in accordance with the techniques described herein. For example, at some time after method 400 is completed, a request may be issued for the newly dehydrated feature file(s). Such a request may trigger method 300 to be performed to rehydrate the previously dehydrated feature file(s).

Figure 5:
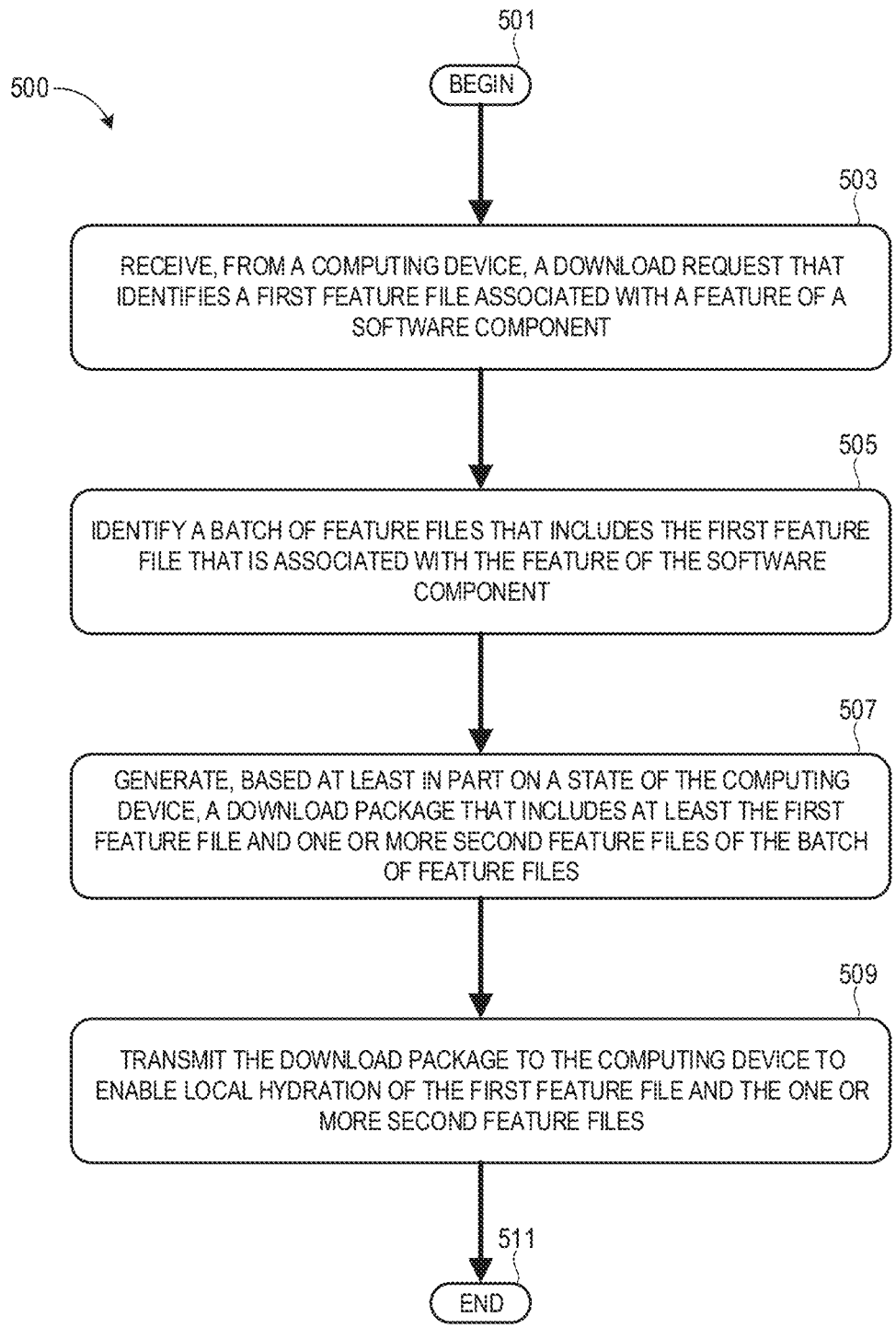
FIG. 5 is a flow diagram for generating download packages that are overinclusive of a download request based on a state of a computing device from which the download request was sent.

Turning now to FIG. 5, illustrated is a flow diagram 500 for generating download packages that are overinclusive of a download request based on a state of a computing device from which the download request was sent. Stated alternatively, a particular download package that is generated responsive to a particular request may be compiled so as to include more data (e.g., more feature files and/or payloads thereof) than is asked for in the particular request.

At block 501, the example method 500 begins.

At block 503, a system (e.g., the feature provider 102) receives a download request from a computing device. For purposes of the present discussion, the download request that is received from the computing device identifies a first feature file that is associated with the feature of a software component such as, for example, the OS 108 and/or the application 110. However, the download request did not explicitly identify one or more second feature files that are also associated with the feature of the software component. For example, as described in relation to FIGS. 2A-2B, an initial request may be generated for a single feature file (e.g., the "Feature_Name2.exe" file) and due to a payload for this single feature file being absent from the local drive, the computing device 106 may utilize one or more system components (e.g., the filter driver 209 and/or the synchronization engine 112) to generate a download request 128 that specifically requests this single feature file be provided from the feature provider 102.

At block 505, the system may identify a batch of feature files that includes the first feature file that is identified within the download request. The identified batch of feature files may include one or more second feature files in addition to the first feature file. Moreover, the first feature file and the one or more second feature files may all be commonly associated with the feature of the software component. Continuing with the example described above in relation to FIGS. 2A-2B, the single feature file may be the file named "Feature_Name2.exe" and the one or more second feature files may include at least the file name "Feature_Name2.dll"—where both the executable (".exe") file formatted feature file and the dynamic link library (".dll") formatted feature file may be usable in conjunction with one another to implement a desired feature of an OS and/or application.

At block 507, the system may generate a download package that includes at least the first feature file (that is specifically identified within the download request) and further includes the one or more second feature files of the batch of feature files associated with the desired feature. In some embodiments, the download package may be generated based at least in part on a current state of the computing device at the time the download request is generated. For example, in some instances one or more individual feature files may be commonly included in two or more batches of feature files. As a specific but nonlimiting example, a particular feature file may serve as a master dynamic link library that is usable by a plurality of different features that are related to one another in some respect. Furthermore, a particular batch of feature files that include the master dynamic link library may be fully hydrated onto the computing device whereas some other batch of feature files that also includes the master dynamic library link may be dehydrated on the computing device. Then, some user activity may be performed that causes generation of a request for a particular dehydrated feature file that belongs to the other batch of feature files. Under these circumstances, upon receiving a download request in association with the other batch of feature files that is currently dehydrated on the computing device, the system may check the current state of the computing device to determine that the master dynamic link library is already fully hydrated onto the computing device. Then, based on this determination, the system may customize the generated download package so as to exclude the master dynamic link library notwithstanding it being a component of the batch of feature files associated with the desired feature.

At block 509, the system may transmit the download package to the computing device to enable local hydration of the first feature file and the one or more second feature files. For example, the system may compress the download package into a suitable compressed format (e.g., a cabinet file having the ".cab" extension) and then transmit the download package to the computing device. Once the download package has been successfully transmitted to the computing device, the example method 500 ends at block 511.

EXAMPLE CLAUSES

The disclosure presented herein may be considered in view of the following clauses.

Example Clause A, a computing device for automatically hydrating batches of feature files, comprising: a local drive; one or more processors; a memory in communication with the one or more processors, the memory storing computer-readable instructions stored thereupon which, when executed by the one or more processors, cause the computing device to: receive a request for access to a first feature file that is usable for implementing a feature of a software component on the computing device; responsive to receiving the request for access to the first feature file, retrieve metadata that is written to the local drive of the computing device to indicate whether a first payload of the first feature file is written to the local drive of the computing device; responsive to the metadata indicating that the first payload of the first feature file is not written to the local drive of the computing device, cause a download request to be transmitted to a feature provider that is associated with the feature of the software component, wherein the feature of the software component corresponds to a batch of feature files that includes at least the first feature file and a second feature file; receive, from the feature provider based on the download request, a download package for the batch of feature files, wherein the download package includes a first payload for the first feature file and a second payload for the second feature file; and based on the download package for the batch of feature files: write the first payload for the first feature file and the second payload for the second feature file to the local drive of the computing device; and service the request by provisioning access to the first payload of the first feature file.

Example Clause B, the computing device of Example Clause A, wherein the computer-readable instructions are further executable to cause the computing device to: in response to the request for access to the first feature file, determine whether the first payload is written to the local drive, wherein causing the download request to be transmitted to the feature provider is responsive to a determination that the first payload is absent from the local drive.

Example Clause C, the computing device of any one of Example Clauses A through B, wherein the computer-readable instructions are further executable to cause the computing device to:

determine whether one or more conditions are met with respect to the batch of feature files subsequent to the request being serviced; and deallocate at least some storage capacity from the batch of feature files responsive to a determination that the one or more conditions have been met.

Example Clause D, the computing device of any one of Example Clauses A through C, wherein deallocating the at least some storage capacity includes at least one of: deleting at least one of the first payload or the second payload from the local drive, or permitting the computing device to overwrite at least one of the first payload or the second payload on the local drive.

Example Clause E, the computing device of any one of Example Clauses A through D, wherein the request is generated based on user activity that is received in association with a feature interface of the software component, and wherein the user activity results in the request being transmitted to a filter driver that is configured to perform hydration checks on the computing device.

Example Clause F, the computing device of any one of Example Clauses A through E, wherein the metadata indicates an address from which the first payload for the first feature file and the second payload for the second feature file are available for download.

Example Clause G, the computing device of any one of Example Clauses A through F, wherein the metadata indicates an identification of the feature provider that is associated with the feature of the software component.

Example Clause H, the computing device of any one of Example Clauses A through G, wherein the software component is an operating system that is executing on the computing device.

Example Clause I, a computer-implemented method comprising: receiving, by a computing device, a request for access to a first payload that corresponds to a first feature file of a batch of feature files that is usable to implement a feature of a software component on the computing device; retrieving metadata that is stored in association with the first feature file on a storage medium of the computing device; responsive to the request, transmitting a download request to a feature provider that is associated with the feature of the software component, the download request including aspects of the metadata to identify the first feature file; receiving a download package that is transmitted by the feature provider based on the download request, the download package including the first payload that corresponds to the first feature file and at least one second payload that corresponds to at least one second feature file of the batch of feature files; and based on the download package, servicing the request by provisioning access to the first payload that corresponds to the first feature file and the second payload that corresponds to the second feature file.

Example Clause J, the computer-implemented method of Example Clause I, further comprising: writing, based on the download package, the first payload that corresponds to the first feature file and the at least one second payload that corresponds to the at least one second feature file to the storage medium of the computing device.

Example Clause K, the computer-implemented method of any one of Example Clauses I through J, further comprising: performing, responsive to the request, a hydration check to determine whether the first payload that corresponds to the first feature file is available from the storage medium of the computing device; and generating the download request in response to a determination that the first payload is absent from the storage medium.

Example Clause L, the computer-implemented method of any one of Example Clauses I through K, further comprising: subsequent to the servicing the request by provisioning access to the first payload, deallocating at least some storage capacity from the first feature file responsive to a determination that a threshold period of time has elapsed since the last use of the first feature file.

Example Clause M, the computer-implemented method of any one of Example Clauses I through L, wherein the deallocating the at least some storage capacity from the first feature file includes deleting the first payload from the storage medium of the computing device.

Example Clause N, the computer-implemented method of any one of Example Clauses I through M, wherein the metadata indicates at least one of: an address from which the first payload for the first feature file is available for download, or the feature provider.

Example Clause O, the computer-implemented method of any one of Example Clauses I through N, wherein the download request includes an identification of the first feature file and lacks an identification of the second feature file.

Example Clause P, a system, comprising: one or more processors; a memory in communication with the one or more processors, the memory having computer-readable instructions stored thereupon which, when executed by the one or more processors, cause the system to: receive, from a computing device, a download request that identifies a first feature file associated with a feature of a software component; identify, based on the request, a batch of feature files that is associated with the feature of the software component, wherein the batch of feature files includes the first feature file and one or more second feature files; generate a download package that includes at least a first payload that corresponds to the first feature file and one or more second payloads that corresponds to the one or more second feature files; and transmit the download package to the computing device to enable implementation of the feature of the software component.

Example Clause Q, the system of Example Clause P, wherein the batch of feature files further includes a third feature file, and wherein the computer-readable instructions are further executable by the one or more processors to cause the system to omit a third payload that corresponds to the third feature file from the download package based on a state of the computing device corresponding to the third payload being written to a local storage medium on the computing device.

Example Clause R, the system of any one of Example Clauses P through Q, wherein the software component is an operating system that is executing on the computing device.

Example Clause S, the system of any one of Example Clauses P through R, wherein the first feature file that is identified in the download request is a first file format, and wherein the one or more second feature files that are provided in the download package are formatted according to one or more second file formats.

Example Clause T, the system of any one of Example Clauses P through S, wherein the download request that identifies the first feature file lacks an identification of the one or more second feature files.

CONCLUSION

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computing device for automatically hydrating batches of feature files, comprising:
   a local drive;
   at least one processor;
   a memory in communication with the at least one processor, the memory storing computer-readable instructions stored thereupon which, when executed by the at least one processor, cause the computing device to:
   receive a request for access to a first feature file that is usable for implementing a feature of a software component on the computing device;
   responsive to receiving the request for access to the first feature file, retrieve metadata that is written to the local drive of the computing device to indicate whether a first payload of the first feature file is written to the local drive of the computing device;
   responsive to the metadata indicating that the first payload of the first feature file is not written to the local drive of the computing device, cause a download request to be transmitted to a feature provider that is associated with the feature of the software component, wherein the feature of the software component corresponds to a batch of feature files that includes at least the first feature file and a second feature file;
   receive, from the feature provider based on the download request, a download package for the batch of feature files, wherein the download package includes a first payload for the first feature file and a second payload for the second feature file; and
   based on the download package for the batch of feature files:
   write the first payload for the first feature file and the second payload for the second feature file to the local drive of the computing device; and
   service the request by provisioning access to the first payload of the first feature file.

2. The computing device of claim 1, wherein the computer-readable instructions are further executable by the at least one processor to cause the computing device to:

in response to the request for access to the first feature file, determine whether the first payload is written to the local drive, wherein causing the download request to be transmitted to the feature provider is responsive to a determination that the first payload is absent from the local drive.

3. The computing device of claim 1, wherein the computer-readable instructions are further executable by the at least one processor to cause the computing device to:
determine whether at least one condition is met with respect to the batch of feature files subsequent to the request being serviced; and
deallocate at least some storage capacity from the batch of feature files responsive to a determination that the at least one condition has been met.

4. The computing device of claim 3, wherein deallocating the at least some storage capacity includes at least one of:
deleting at least one of the first payload or the second payload from the local drive, or
permitting the computing device to overwrite at least one of the first payload or the second payload on the local drive.

5. The computing device of claim 1, wherein the request is generated based on user activity that is received in association with a feature interface of the software component, and wherein the user activity results in the request being transmitted to a filter driver that is configured to perform hydration checks on the computing device.

6. The computing device of claim 1, wherein the metadata indicates an address from which the first payload for the first feature file and the second payload for the second feature file are available for download.

7. The computing device of claim 1, wherein the metadata indicates an identification of the feature provider that is associated with the feature of the software component.

8. The computing device of claim 1, wherein the software component is an operating system that is executing on the computing device.

9. A computer-implemented method comprising:
receiving, by a computing device, a request for access to a first payload that corresponds to a first feature file of a batch of feature files that is usable to implement a feature of a software component on the computing device;
retrieving metadata that is stored in association with the first feature file on a storage medium of the computing device;
responsive to the request, transmitting a download request to a feature provider that is associated with the feature of the software component, the download request including aspects of the metadata to identify the first feature file;
receiving a download package that is transmitted by the feature provider based on the download request, the download package including the first payload that corresponds to the first feature file and at least one second payload that corresponds to at least one second feature file of the batch of feature files; and
based on the download package, servicing the request by provisioning access to the first payload that corresponds to the first feature file and the at least one second payload that corresponds to the at least one second feature file.

10. The computer-implemented method of claim 9, further comprising:
writing, based on the download package, the first payload that corresponds to the first feature file and the at least one second payload that corresponds to the at least one second feature file to the storage medium of the computing device.

11. The computer-implemented method of claim 9, further comprising:
performing, responsive to the request, a hydration check to determine whether the first payload that corresponds to the first feature file is available from the storage medium of the computing device; and
generating the download request in response to a determination that the first payload is absent from the storage medium.

12. The computer-implemented method of claim 9, further comprising:
subsequent to the servicing the request by provisioning access to the first payload, deallocating at least some storage capacity from the first feature file responsive to a determination that a threshold period of time has elapsed since the last use of the first feature file.

13. The computer-implemented method of claim 12, wherein the deallocating the at least some storage capacity from the first feature file includes deleting the first payload from the storage medium of the computing device.

14. The computer-implemented method of claim 9, wherein the metadata indicates at least one of: an address from which the first payload for the first feature file is available for download, or the feature provider.

15. The computer-implemented method of claim 9, wherein the download request includes an identification of the first feature file and lacks an identification of the second feature file.

16. A system, comprising:
at least one processor;
a memory in communication with the at least one processor, the memory having computer-readable instructions stored thereupon which, when executed by the at least one processor, cause the system to:
receive, from a computing device, a download request that:
identifies a first feature file associated with a feature of an operating system, that is not written to a local drive of the computing device; and
lacks an identification of at least one second feature file associated with the feature of the operating system;
identify, based on the download request, a batch of feature files that is associated with the feature of the operating system, wherein the batch of feature files includes the first feature file and the at least one second feature file;
generate a download package that includes at least a first payload that corresponds to the first feature file and at least one second payload that corresponds to the at least one second feature file; and
transmit the download package to the computing device to enable implementation of the feature of the operating system such that the computing device is enabled to service a request by provisioning access to the first payload that corresponds to the first feature file and the at least one second payload that corresponds to the at least one second feature file.

17. The system of claim 16, wherein the batch of feature files further includes a third feature file, and wherein the computer-readable instructions are further executable by the at least one processor to cause the system to omit a third payload that corresponds to the third feature file from the download package based on a state of the computing device corresponding to the third payload being written to local drive of the computing device.

18. The system of claim 16, wherein the first feature file that is formatted according to a first file format, and wherein the at least one second feature file is formatted according to at least one second file format.

\* \* \* \* \*